United States Patent
Pleva et al.

(10) Patent No.: US 7,248,215 B2
(45) Date of Patent: Jul. 24, 2007

(54) BEAM ARCHITECTURE FOR IMPROVING ANGULAR RESOLUTION

(75) Inventors: Joseph S. Pleva, Londonderry, NH (US); Wilson Wimmer, North Andover, MA (US)

(73) Assignee: Valeo Raytheon Systems, Inc, Hudson, NH (US)

( * ) Notice: Subject to any disclaimer, the term of this patent is extended or adjusted under 35 U.S.C. 154(b) by 0 days.

(21) Appl. No.: 11/026,506

(22) Filed: Dec. 30, 2004

(65) Prior Publication Data

US 2006/0145919 A1 Jul. 6, 2006

(51) Int. Cl.
*G01S 13/00* (2006.01)

(52) U.S. Cl. .................. 342/368; 342/81; 342/154; 342/373

(58) Field of Classification Search .......... 342/81, 342/154, 368, 373, 374
See application file for complete search history.

(56) References Cited

U.S. PATENT DOCUMENTS

| | | | |
|---|---|---|---|
| 2,540,839 A | 2/1951 | Southworth | |
| 4,286,236 A | 8/1981 | Fischer | |
| 5,194,823 A | 3/1993 | Wendt et al. | |
| 5,592,178 A * | 1/1997 | Chang et al. | 342/372 |
| 5,708,433 A | 1/1998 | Craven | |
| 5,727,023 A | 3/1998 | Dent | |
| 6,039,580 A | 3/2000 | Sciarretta et al. | |
| 6,167,286 A * | 12/2000 | Ward et al. | 455/562.1 |
| 6,198,449 B1 * | 3/2001 | Muhlhauser et al. | 343/753 |
| 6,218,987 B1 | 4/2001 | Derneryd et al. | |
| 6,324,755 B1 | 12/2001 | Borkowski et al. | |
| 6,463,303 B1 * | 10/2002 | Zhao | 455/562.1 |
| 6,489,927 B2 | 12/2002 | LeBlanc et al. | |
| 6,492,949 B1 | 12/2002 | Breglia et al. | |
| 6,501,415 B1 | 12/2002 | Viana et al. | |
| 6,577,269 B2 | 6/2003 | Woodington et al. | |
| 6,577,879 B1 * | 6/2003 | Hagerman et al. | 455/562.1 |
| 6,642,908 B2 | 11/2003 | Pleva et al. | |
| 6,683,557 B2 | 1/2004 | Pleva et al. | |
| 6,738,017 B2 * | 5/2004 | Jacomb-Hood | 342/368 |
| 6,784,838 B2 * | 8/2004 | Howell | 342/377 |
| 6,864,699 B2 | 3/2005 | Sakayori et al. | |
| 6,933,900 B2 * | 8/2005 | Kitamori et al. | 343/713 |

(Continued)

FOREIGN PATENT DOCUMENTS

WO  WO 2004/044610 A1  5/2004

OTHER PUBLICATIONS

European Search Report and Written Opinion for EP 05 111 983 dated Apr. 7, 2006.

(Continued)

*Primary Examiner*—Dao L. Phan
(74) *Attorney, Agent, or Firm*—Daly, Crowley, Mofford & Durkee, LLP

(57) ABSTRACT

An automotive radar system includes a beamformer circuit and a beamcombiner circuit. The beamformer circuit forms a plurality of antenna beams at a plurality of beam ports. The beam combiner circuit receives the beams provided thereto from the beamformer circuit and combines the beams to provide a desired number of beams, with each of the beams having a desired beam shape. In one embodiment, the beamcombiner provides first and second end beams having a beamwidth which is less than a beamwidth of middle beams.

23 Claims, 8 Drawing Sheets

U.S. PATENT DOCUMENTS

| | | | |
|---|---|---|---|
| 6,995,730 | B2 | 2/2006 | Pleva et al. |
| 7,038,608 | B1 | 5/2006 | Gilbert |
| 2004/0027305 | A1 | 2/2004 | Pleva et al. |
| 2004/0164892 | A1 | 8/2004 | Shinoda et al. |
| 2004/0208249 | A1 | 10/2004 | Risbo et al. |
| 2006/0125682 | A1 | 6/2006 | Kelly, Jr. et al. |

OTHER PUBLICATIONS

Cheng; "A Fast Hybrid MoM/FEM Technique for Microstripline Vertical Couplers With Multiple Identical Cavaties;" IEEE Jun. 2003; 0-7803-7846; pp. 1076-1079.

Gao et al.: "Adaptive Linearization Schemes for Weakly Nonlinear Systems Using Adaptive Linear and Nonlinear FIR Filters;" Dept. of Electrical Engineering, University of Toronto; IEEE; Jan. 1991; CH2819-1/90/0000-0009; pp. 9-12.

Gilbert; "Multi-Stage Finite Impulse Response Filter Processing"; U.S. Appl. No. 11/323,459, filed Dec. 30, 2005.

Hunt; "Generating Event Signals In A Radar System;" U.S. Appl. No. 11/323,960, filed Dec. 30, 2005.

Leblanc et al.; "Vehicle Radar Sensor Assembly"; U.S. Appl. No. 11/323,816, filed Dec. 30, 2005.

Lin et al.; "A High Speed Low-Noise Equalization Technique with Improved Bit Error Rate;" EEE; Jul. 2002; 0-7803-7448; pp. 564-567.

Lohinetong et al.; "Microstrip To Surface Mounted Foam-Based Waveguide Transition For Ka-Band Filter Integration;" IEEE Jun. 2004; 0-7803-8401; pp. 899-902.

Lohmeier et al.; "Method And System For Generating A Target Alert;" U.S. Appl. No. 11/322,869, filed Dec. 30, 2005.

Lohmeier et al.; "System And Method For Generating A Radar Detection Threshold;" U.S. Appl. No. 11/322,684, filed Dec. 30, 2005.

Lohmeier et al.; "System And Method For Verifying A Radar Detection;" U.S. Appl. No. 11/324,073, filed Dec. 30, 2005.

Mueller; "SMD-Type 42 GHz Waveguide Filter;" IEEE Jan. 2003; 0-7803-7695; pp. 1089-1092.

Nordsjo; "An Algorithm for Adaptive Predisortion of Certain Time-Varying Nonlinear High-Power Amplifiers;" 2002 The Institution of Electrical Engineers; XP-002364938; pp. 469-473.

Pleva, et al.; "Waveguide—Printed Wiring Board (PWB) Interconnection"; U.S. Appl. No. 11/027,523, filed Dec. 30, 2004.

Woodington, et al.; "Detecting Signal Interference In A Vehicle System"; U.S. Appl. No. 11/427,829, filed Jun. 30, 2006.

Woodington, et al.; "Multichannel Processing Of Signals In A Radar System"; U.S. Appl. No. 11/323,458, filed Dec. 30, 2005.

Woodington, et al.; "Vehicle Radar Systems Having Multiple Operating Modes"; U.S. Appl. No. 11/324,458, filed Dec. 30, 2005.

Woodington; "Reducing Undesirable Coupling Of Signal(s) Between Two Or More Signal Paths In A Radar System"; U.S. Appl. No. 11/322,664, filed Dec. 30, 2005.

Woodington; "Reducing Undesirable Coupling Of Signal(s) Between Two or More Signal Paths In A Radar System"; U.S. Appl. No. 11/322,982, filed Dec. 30, 2005.

EP Search Report and Written Opinion of the European Patent Office for EP 05 11 1991.5; dated Mar. 2, 2006.

EP Search Report and Written Opinion of the European Patent Office for EP 05 11 1994.9 dated Mar. 31, 2006.

\* cited by examiner

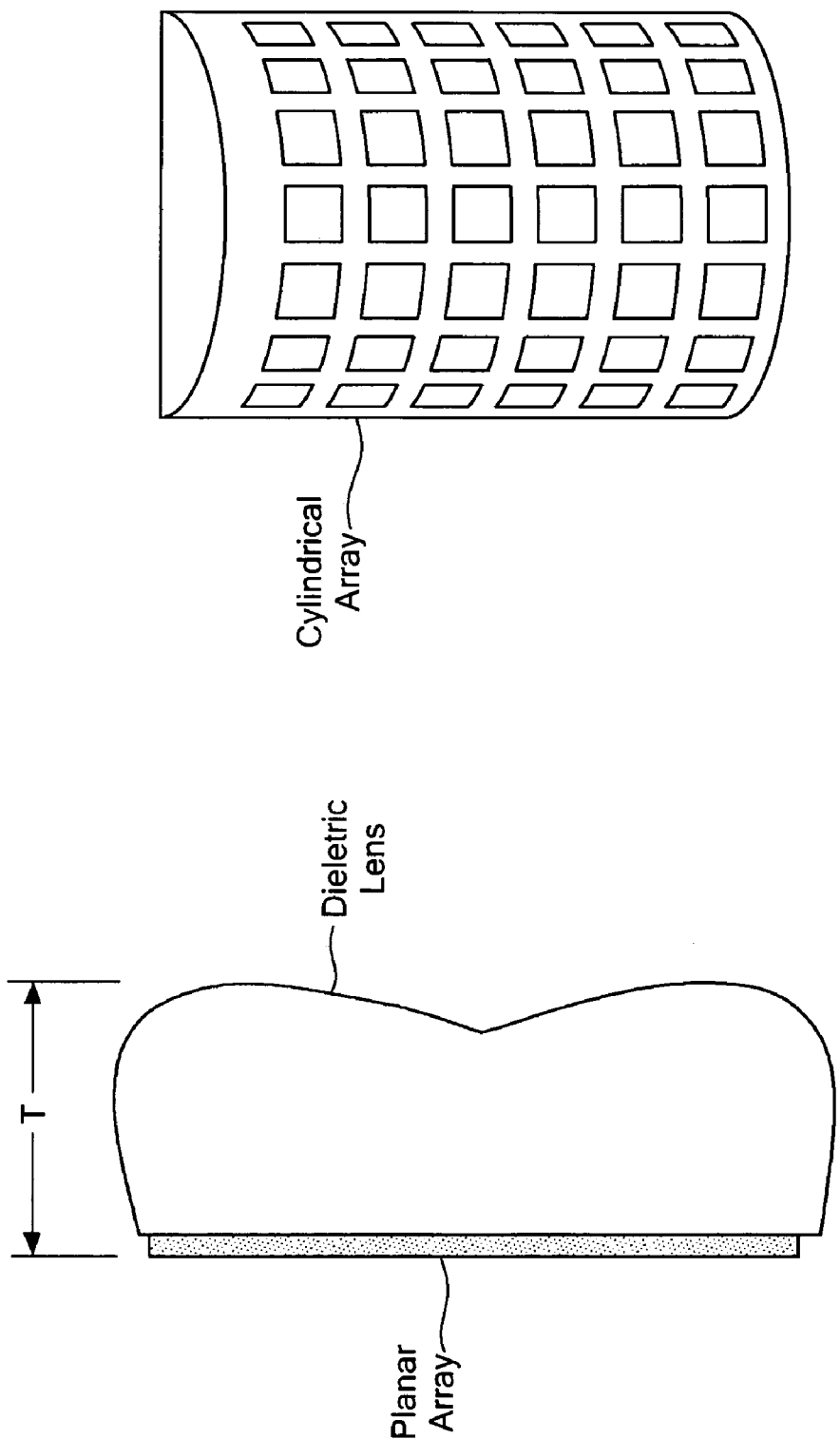

BEAM ARCHITECTURE FOR IMPROVING ANGULAR RESOLUTION

CROSS-REFERENCE TO RELATED APPLICATIONS

Not applicable.

STATEMENTS REGARDING FEDERALLY SPONSORED RESEARCH

Not applicable.

FIELD OF THE INVENTION

This invention relates generally to radar systems and more particularly to techniques for generating antenna beams for use in vehicle radar systems.

BACKGROUND OF THE INVENTION

As is known in the art, there is an increasing trend to include radar systems in commercially available products. For example, it is desirable to include radar systems in automobiles, trucks, boats, airplanes and other vehicles. Such radar systems are preferably compact and relatively low cost.

Many products impose relatively strict requirements on both the physical size and operational performance of the radar system. Such requirements make the design of radar systems for use in commercial products relatively challenging. Among the design challenges is the challenge to provide an antenna system which meets the design goals of being high performance, low cost and compact.

In automotive radar systems, for example, cost and size considerations are of considerable importance. Furthermore, in order to meet the performance requirements of automotive radar applications, (e.g. coverage area) multiple-beam antenna systems are typically required.

In one automotive radar system, a certain amount of resolution is desired in order to detect and track objects. To provide a system having acceptable resolution, an antenna system which produces multiple antenna beams can be used. One technique to increase the resolution of the system is to increase the number of antenna beams provided by the antenna system. Another approach to obtain additional resolution is to utilize relatively complex techniques such as monopulse or interferometer techniques to measure angle in a certain direction (e.g., azimuth angle). One problem with these techniques, however, is that they typically result in relatively high cost systems.

SUMMARY OF THE INVENTION

In accordance with the present invention, an antenna system includes a beamformer circuit having a plurality of antenna ports and a plurality of beam ports and a beam combiner circuit adapted to receive signals from the beam ports of the beamformer circuit and to combine the signals to generate one or more combined beams which are provided at an output thereof. The beam combiner circuit combines beams from the beamformer circuit in such a way as to provide a combined beam having a desired beam shape. With this particular arrangement, an antenna system which combines beams to provide a desired set of beams with each of the beams having a desire shape is provided. By appropriately selecting the characteristics of the beamformer and beam combiner circuits, a particular beam architecture can be provided for any application. In one automotive radar application related to blindspot detection, the beamformer and beam combiner circuits are selected to provide a set of antenna beams in which first and second end beams in a set of antenna beams are each provided having beamwidths which are narrower than the beamwidth of a middle beam in the set of antenna beams. With this approach a blind spot detection radar having relatively high angular resolution is provided. The blindspot detection radar can be placed on the side of a vehicle to track other adjacent lane vehicles approaching and/or passing the vehicle, in which the radar is disposed. By shaping the beams with the beamcombiner circuit, to provide broader beams in the middle of the mean set, a sufficient number of detections occur in the middle of the beam(s) to allow tracking of an adjacent vehicle (or other target) in the middle beam(s).

In accordance with a further aspect of the present invention, a vehicle radar system includes an antenna system which provides a set of antenna beams with each of the antenna beams having an antenna beamwidth selected such that each antenna beam covers a similar amount of area in space within a given coverage zone.

With this particular arrangement, a beam architecture which improves angular resolution of a radar system in a desired plane is provided. The improved angular resolution occurs by having each antenna beam cover a similar amount of area in space within a given coverage zone. In one embodiment, this is accomplished by narrowing end beams and/or broadening middle beams of a multi-beam antenna pattern. With this approach, an object traveling through each of the multiple beams produces a similar number of object detections in each beam as the object moves from beam to beam. In some applications, a system having a beam architecture in which beams cover a similar amount of space in a single plane can improve the overall azimuth resolution of a radar for any given number of azimuth beams (greater than two azimuth beams) while at the same time having a relatively small impact on cost and system complexity. In some automotive radar applications for example, the azimuth plane of an antenna corresponds to the plane of the road surface and the beam architecture described herein improves the overall azimuth resolution of the radar for any given number of azimuth beams. It should be appreciated, however, that the beam architecture of the present invention can benefit applications other than automotive radar applications. The beam architecture of the present invention can benefit any beam-limited application in which object detections of interest travel primarily in the radar's azimuth plane. It should be appreciated, of course, that the same principles described herein could be equally applied in the elevation plane of a radar. The invention is particularly useful in those applications in which the radar's minimum range (i.e. the minimum operational range at which the radar detects a target) is a relatively small fraction of its maximum range (i.e. the maximum operational range at which the radar detects a target) because such applications tend to have a need for beam architectures which result in significant target detections in each beam. Some of the specific automotive radar applications that can benefit from using this approach to radar beam architecture include but are not limited to blind spot detection, lane change, park slot measurement, cross-traffic warning, pre-crash, parking aid (including both front and back-up) and autonomous cruise control (ACC). In these applications, azimuth resolution is relatively important to system performance (since it is relatively important to have accurate information with respect to the location of objects). In some applications, the detections of interest are provided by objects travelling in a direction substantially parallel to the direction in which the vehicle containing the radar is travelling.

In accordance with a further aspect of the present invention, a technique for providing a beam architecture for an antenna system includes providing a set of antenna beams with each of the antenna beams having a beam shape selected such that an object moving through each of the antenna beams at a substantially constant relative velocity with respect to the antenna system is detected substantially the same number of times in each antenna beam.

With this particular arrangement, a technique for improving angular resolution of an antenna system is provided. By having antenna beams with a beam shape selected such that a substantially equal number of detections can occur in each beam (for a constant velocity target) the angular resolution provided by the antenna system is increased for a given number of antenna beams. In one automotive radar system, this is accomplished by narrowing end beams and broadening middle beams of a multi-beam antenna system. In another embodiment, this can be accomplished by simply broadening middle beams of a multi-beam antenna system. In still another embodiment, this can be accomplished by simply narrowing end beams of a multi-beam antenna.

In accordance with a still further aspect of the present invention a method of operating a radar comprises providing a plurality of beams and combining beams to provide a shaped beam pattern for beam architecture) to match a particular detection environment. With this particular arrangement, a technique for improving radar performance in any application is provided by combining beams to provide a shaped beam pattern. By tracking a target with a shaped a beam pattern, a desired number of detections can be made to occur in each beam. By providing a shaped beam pattern in which a similar number of detections occur in each beam, radar resources (e.g. processing resources) can be used more efficiently and thus radar efficiency is improved. In some applications, this approach can also increase angular resolution since a similar number of target detections can occur in each beam.

BRIEF DESCRIPTION OF THE DRAWINGS

The foregoing features of this invention, as well as the invention itself, may be more fully understood from the following description of the drawings in which:

FIG. 8 is a block diagram of a planar array antenna having a dielectric lens disposed over a first surface thereof; and FIG. 9 is a block diagram of a cylindrical array antenna.

DETAILED DESCRIPTION

Figure 1:
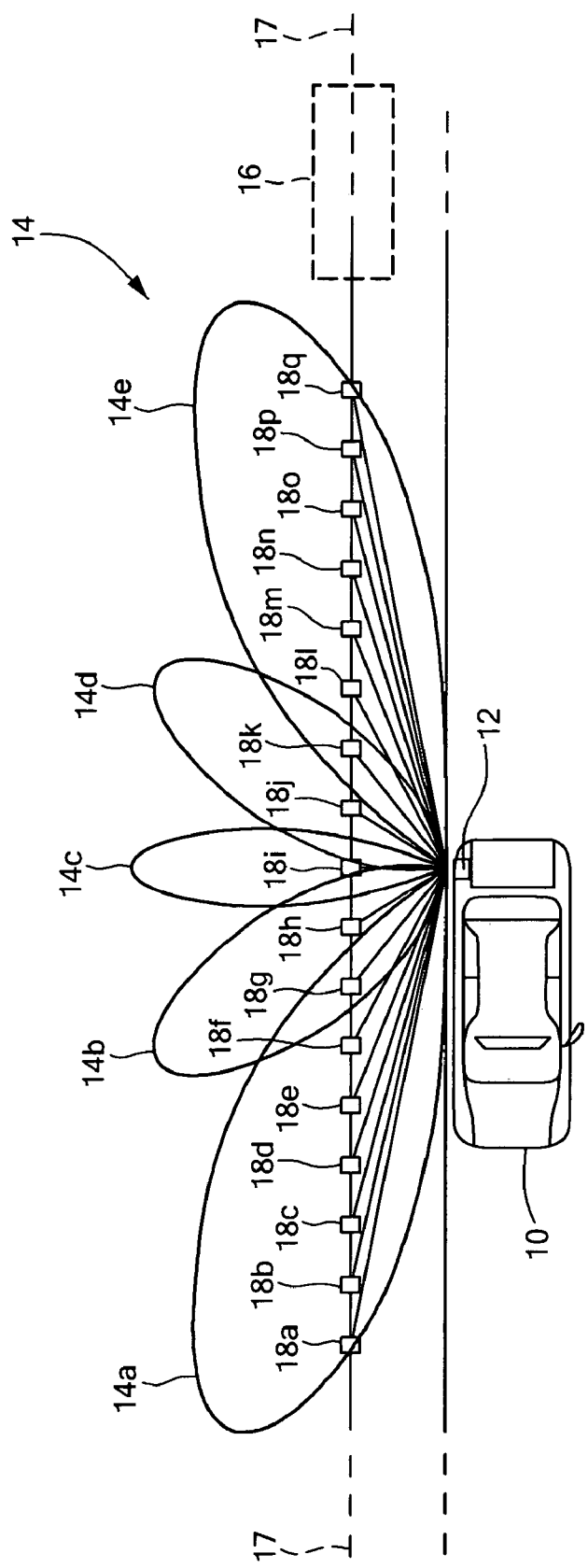
FIG. 1 is a block diagram of a prior art automotive radar system.

Referring now to FIG. 1, a vehicle 10 has a prior art automotive radar system 12 disposed on a side thereof. The automotive radar system 12 may, for example be provided as a side object detection system (SOD) also sometimes referred to as a blind spot detection system. A typical prior art automotive radar system, such as radar system 12, includes a planar array antenna capable of generating multiple antenna beams with five antenna beams (or more simply "beams") 14a–14e being here shown. In automotive radar applications, the azimuth plane of the antenna often corresponds to the plane of the road surface Radar 12 detects an object 16 moving along a path 17 which is parallel to the path of the vehicle 10 in which the radar 12 is disposed. The object 16, may for example, be another vehicle approaching and passing vehicle 10 in which the radar is disposed. The vehicle 16 can thus correspond to a vehicle in a lane in which is adjacent the vehicle 10 and thus the vehicle 16 is sometimes referred to herein as an adjacent vehicle or an adjacent object. The object 16 is detected in each of the antenna beams 14a–14e. The object 16 may, for example, be a second vehicle overtaking the first vehicle 10. Alternatively, the object 16 may be a second vehicle moving past the first vehicle 10 in a direction opposite to the direction of travel of the first vehicle 10.

As can be seen in FIG. 1, seven detections 18a–18g occur in beam 14a, two detections 18g, 18h occur in beam 14b, one detection 18i occurs in beam 14c, two detections 18j, 18k occur in beam 14d and seven detections 18k–18q occur in beam 14e. Thus, many more detections occur in the end beams 14a, 14e than occur in the middle beams 14b, 14c, 14d. Stated differently, object 16 is detected in beams 14a, 14e for longer periods of time than in beams 14b–14d. This means that the object 16 is not tracked at a high resolution in the end beams 14a, 14e.

As is known, in a conventional planar array antenna, beamwidth is inversely related to aperture size. Also, a planar array antenna typically has the characteristic of having narrow beams at small scan angles and broader beams at larger scan angles. This is due to aperture foreshortening with scan angles, which can be shown by simple geometry to behave as:

Effective Aperture≈cos Θ where Θ is the scan angle of the beam with respect to the antenna face normal. Thus, as illustrated in FIG. 1, beams 14a and 14e (which are at relatively large scan angles) each have a wider beamwidth than beam 14c which is at a small scan angle (i.e., the direction of beam 14c is substantially normal to the radiating antenna aperture of the radar system 12).

Figure 2:
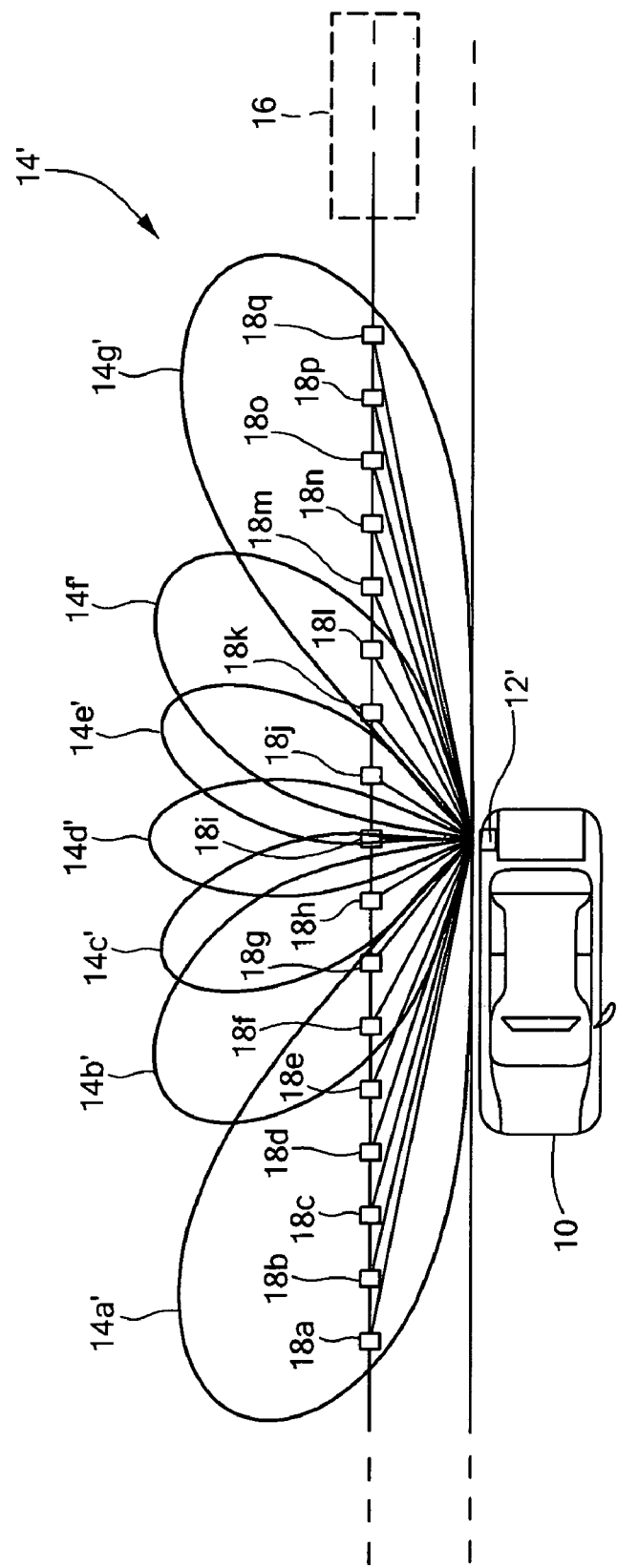
FIG. 2 is a block diagram of a second, different prior art automotive radar system.

To improve the azimuth resolution of automotive radar systems, prior art approaches such as that shown in FIG. 2 have been used.

Referring now to FIG. 2, in which like elements of FIG. 1 are provided having like reference designations, the vehicle 10 has a second prior art automotive radar system 12' disposed on a side thereof. The second automotive radar system 12' includes a planar array antenna which provides seven antenna beams 14a'–14g'. By detecting object 16 in seven beams (rather than in five beams as shown in FIG. 1), the azimuth resolution of the system is improved somewhat since the object can be tracked through two additional antenna beams. Thus, the system 12' addresses the need for azimuth resolution by adding additional antenna beams.

Nevertheless, due to the above-described aperture foreshortening affect, the beamwidth of each of the end beams 14a', 14g' is wider that the beamwidth of the middle beams 14b''14f'. Thus, although the azimuth resolution has been increased for the middle beams 14b'–14f' by the addition of two antenna beams, the added resolution has little or no benefit to the system since the beamwidth of the end beams is still wider than the beamwidth of the middle beams and thus more target detections occur in each of the end beams than occur in each of the individual middle beams.

As can be seen in FIG. 2, seven detections 18a'–18g' occur in end beam 14a', three detections 18f', 18g', 18h' occur in beam 14b', two detections 18h', 18i occur in beam 14c', one detection 18i occurs in beam 14d', two detections 18i', 18j' occur in beam 14e', three detections 18j', 18k', 18l' occur in beam 14f' and seven detections 18k'–18q' occur in end beam 14g'. Thus, many more detections occur in the end beams 14a', 14g' than occur in the middle beams 14b', 14c', 14d', 14e', 14f'.

It has thus been recognized in accordance with the present invention, that in an automotive radar application, the scan angle characteristic of a planar array antenna results in a system having an azimuth resolution which is less than desired. It should be appreciated that in the automotive radar applications referred to herein, the azimuth plane of the antenna and the radar corresponds to a plane substantially aligned with the a plane defined by a surface of the road. It should be understood that the surface of many practical roads are not ideally flat and thus the plane of the road should be understood to be a plane which is generally perpendicular the a face of the automotive radar system. Also, as will become apparent from the description hereinbelow, it has been recognized in accordance with the present invention that a beam architecture (i.e. a selected number of beams having selected beams shapes within a desired coverage zone) in which a similar number of detections occur in the end and middle radar beams results in a radar system having improved angular resolution.

Furthermore, it should be noted that the system 12' (being a seven beam system) is relatively expensive and complex when compared with the five beam system 12 described in conjunction with FIG. 1 above. Besides the increase in cost and complexity, the resultant system 12' (FIG. 2) is inefficient when comes to use with the automotive radar applications described above. The inefficiency results because many more detections still occur in the end beams than the middle beams. Thus, little, if any additional information which can be used for target tracking is provided by the detections in the newly added middle beams.

Figure 3:
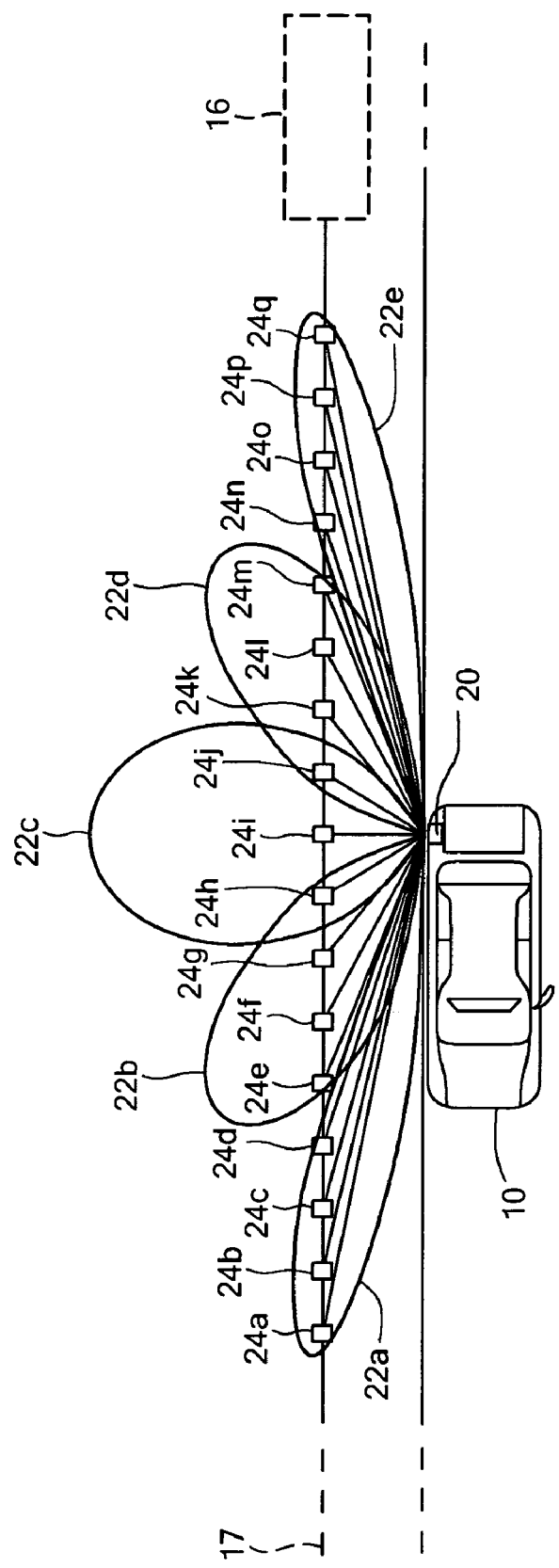
FIG. 3 is a block diagram of an automotive radar system having an antenna beam architecture with improved angular resolution.

Referring now to FIG. 3, a vehicle 10 has an automotive radar system 20 disposed thereon. In this example, the automotive radar system 20 includes an antenna system which generates five antenna beams 22a–22e.

The radar 20 detects an object 16 moving along a path 17 which is parallel to the path along which the vehicle 10 (and consequently the radar 20) is travelling. The object 16 may, for example, correspond to a second vehicle overtaking the first vehicle 10. Alternatively, the object 16 may be a second vehicle moving past the first vehicle 10 in a direction opposite to the direction in which the first vehicle 10 is travelling.

The object 16 is detected in each of the antenna beams 22a–22e. As can be seen from FIG. 3, the beamwidth of each of the beams 22a–22e has been adjusted such that each of the beams covers a similar amount of area in space within a given coverage zone along path 17. Consequently, four detections 24a–24d occur in beam 22a, four detections occur in beam 22b, three detections 24h–24j occur in beam 22c, four detections 24j–24m occur in beam 22d and four detections 24h–24q occur in beam 22e. Thus, a substantially equal number of detections occurs in each of the beams 22a–22e.

In the particular embodiment of FIG. 3, the beam architecture which provides equal beam coverage has been achieved by narrowing the beamwidth of the end beams and broadening the beamwidth of the middle beams of the radar system. This effect is achieved by increasing (compared with the antenna used in the system shown in FIG. 1) the number of beams which the antenna is capable of generating and increasing the aperture's azimuth dimension to narrow the end beams and by combining beams to broaden the middle beams. The resultant beam architecture can thus be obtained without increasing the total number of beams and therefore the complexity of the radar remains unchanged.

In one embodiment, the five beams are generated by combining beams generated via a beamforming network provided as part of an antenna system. One beam combining technique is described in U.S. Pat. No. 6,642,908 and a particular example of combining beams is described below in conjunction with FIGS. 4–6.

As clearly shown in FIG. 3, the detections 24a–24q are well distributed amongst the five beams 22a–22e which results in a better definition of the azimuth plane and thus improves the overall azimuth resolution. It should be appreciated that the beam architecture technique for increasing azimuth resolution described herein does not increase the number of beams or the complexity of the radar system; it merely uses the available beams more efficiently by shaping the beams for particular applications.

It should be appreciated that although the example of FIG. 3 uses five antenna beams, the beam architecture concept illustrated in FIG. 3 applies equally well to radar systems having any number of antenna beams.

Figure 4:
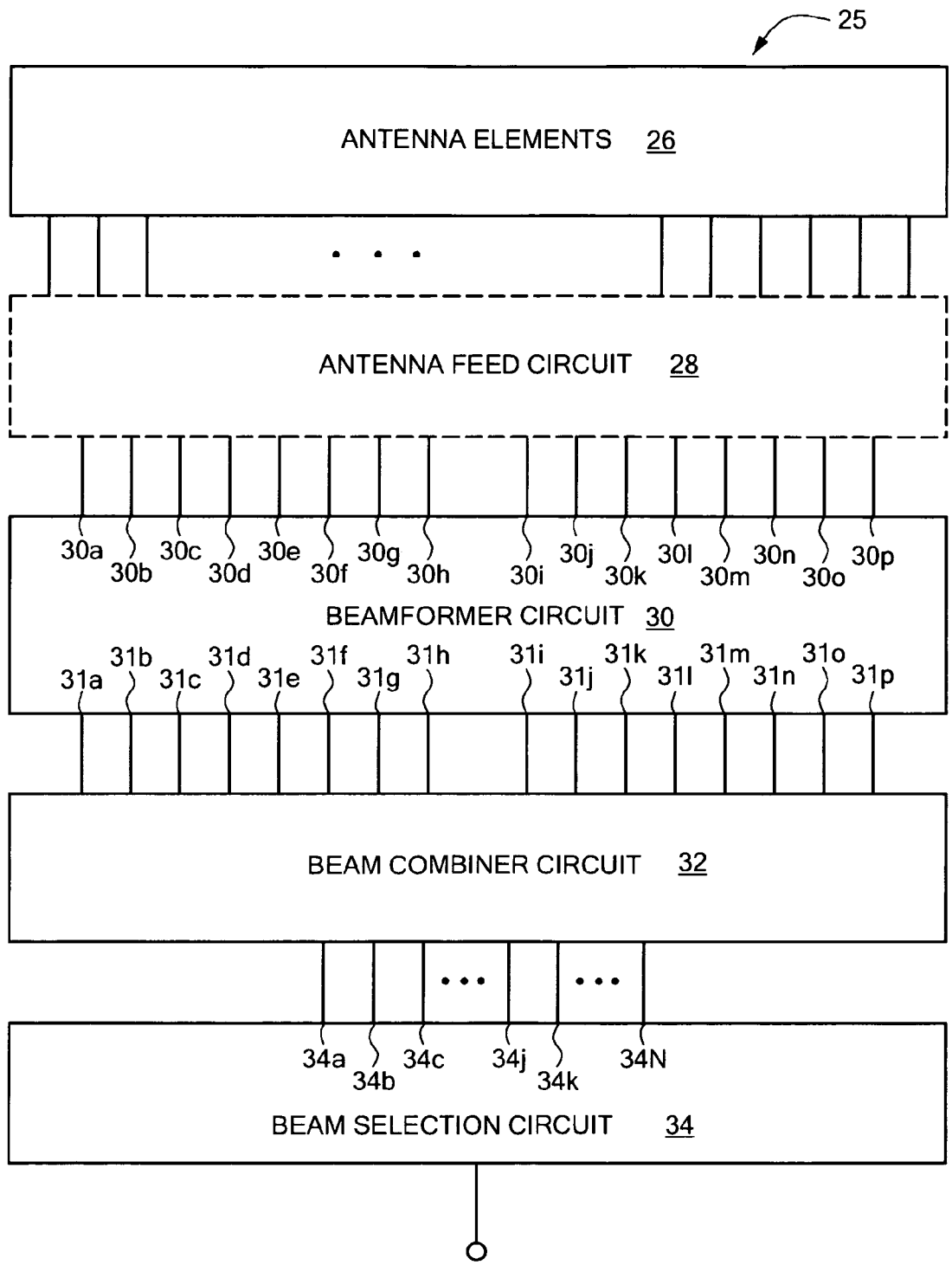
FIG. 4 is a block diagram of an antenna system having a beamformer and a beam combiner circuit which provide a desired beam architecture.

Referring now to FIG. 4, an antenna system 25 includes a plurality of antenna elements 26 coupled through an optional antenna feed circuit 28 to a beamformer circuit 30. Beamformer circuit 30 accepts the antenna signals provided thereto at beamformer antenna ports 30a–30p and provides a plurality of antenna beams at ports 31a–31p. The beamformer may be provided for example as a Butler Matrix beamformer circuit. In the exemplary embodiment of FIG. 4, the beamformer circuit is shown having sixteen antenna ports 30a–30p and sixteen beam ports 31a–31p. Thus, in this case, the beamformer provides sixteen beams at ports 31a–31p (i.e. one beam at each of the sixteen ports 31a–31p). This assumes of course that an antenna element is coupled to each of the ports 30a–30p.

Radar processing can be preformed using the sixteen beams provided by such a Butler beamformer circuit. The processing required to process signals in each of the sixteen beams, however, is relatively expensive in terms of processing cost (e.g. processing time) and the cost of hardware required to process data received in sixteen antenna beams. In some applications, it is desirable to cover substantially the same area as the area covered by the sixteen beams, but it is not desirable to incur the processing and dollar cost needed to process data in the sixteen antenna beams. Thus, to provided a desired number of antenna beams, predetermined ones of the beamformer ports 31a–31p are coupled to a beam combiner circuit 32.

The beam combiner circuit 32 combines a predetermined number of the beamformer beams to provide a desired number of beams at ports 34a–34N where N typically corresponds to a number less than the number of beam ports 31 in the beamformer circuit. Moreover, the beam combiner circuit provides each of the beams with a desired beam shape. Such a combination of beams and beam shapes is referred to herein as a beam architecture. One particular set of beam combinations which provide a particular beam architecture is described below in Tables 1 through 3 and in conjunction with FIG. 7. It should be appreciated, of course, that beamformer and beam combiner circuits can be used to provide a nearly unlimited number of different beam architectures. That is, by appropriately selecting the characteristics of the beamformer circuit and the beam combiner circuit, it is possible to provide a nearly unlimited number of different beam architectures.

The beam combiner circuit 32 is coupled to a beam selection circuit 34 which functions to provide a selected one of the beams from beam combiner circuit 32 at port 34a.

It should be appreciated that although the beamformer circuit 30 is here described as providing sixteen beams. Other beamformer circuits which provide fewer or greater than sixteen beams can also be used. The number of antenna elements, optional feed circuit and beamformer circuit should be selected to cooperate together as is generally know. One of ordinary skill in the art will understand how to select specific antenna elements, antenna feed circuits (if any) and beamformer circuits for particular application of interest. Similarly the details of the beam combiner circuit are selected in accordance with the characteristic of the beamformer circuit and the needs of a particular application selected to provide a desired combined set of beams (i.e. a desired set of shaped beams) for a particular application.

Figure 5:
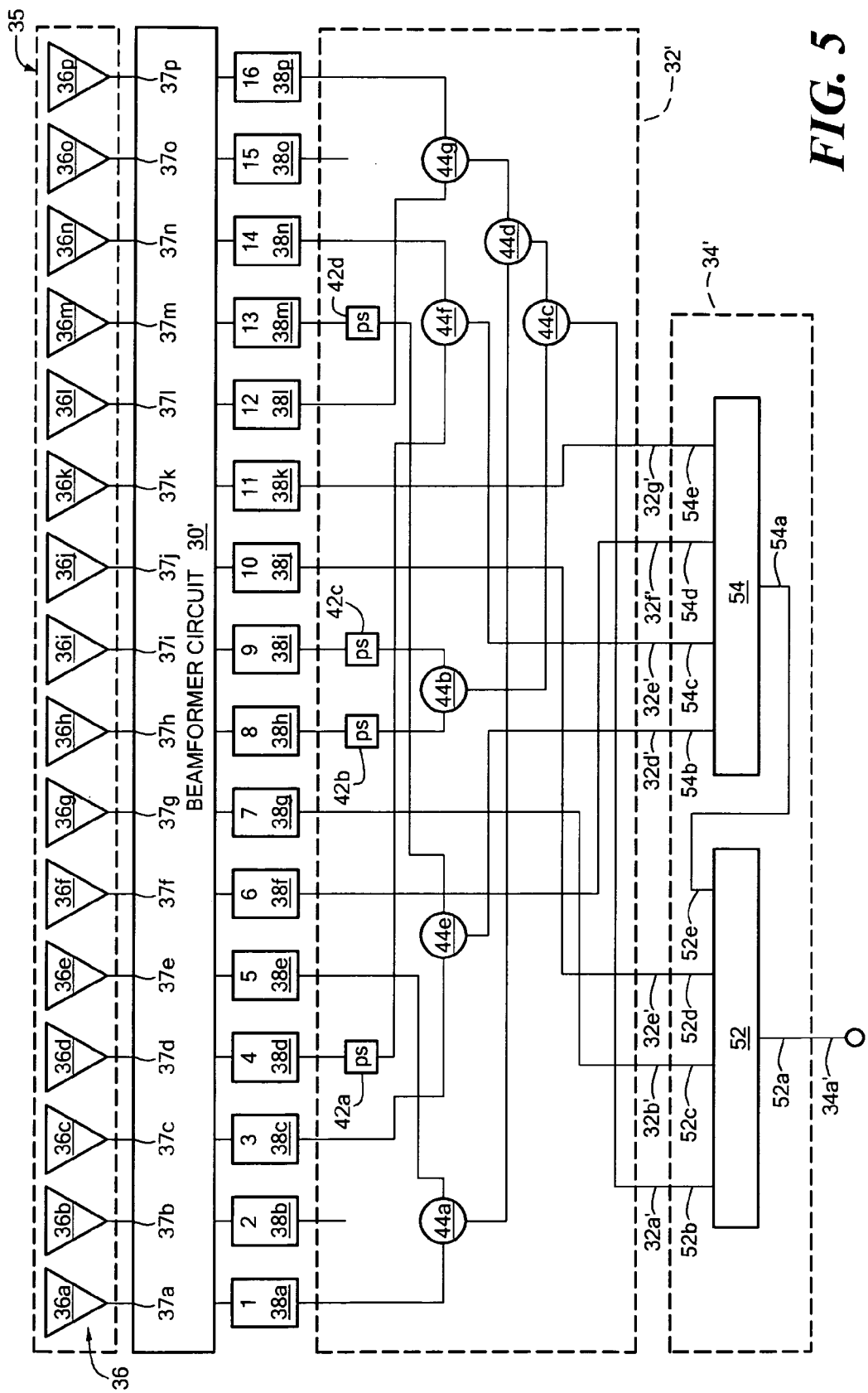
FIG. 5 is a schematic diagram of an antenna system having a sixteen port beamformer circuit coupled to a beam combiner circuit which provides a beam architecture having seven antenna beams for use in an automotive radar.

Referring now to FIG. 5, an antenna system 35 includes an antenna 36 provided from a plurality of antenna elements (also sometimes referred to herein as "radiators") 36a–36p generally denoted 36. In this exemplary embodiment, the antenna is provided as a planar array antenna having sixteen radiators although in other embodiments it may be desirable to use an antenna having fewer or greater than sixteen radiators. More than sixteen radiators may be included, for example, by including an antenna feed circuit as is generally known. It should be appreciated that although not explicitly shown in FIG. 5, the antenna 35 can include a distribution or feed circuit which couples multiple antenna elements to a single feed point. Thus, antenna element 36a, for example, may actually correspond to a plurality of radiating elements which are coupled through a feed circuit to port 37a of the beamformer circuit 30'.

Each of the antenna elements 36 are coupled to a respective one of a plurality of antenna ports 37a–37p of the beamformer circuit 30' which forms a plurality of antenna beams. In this exemplary embodiment, the beamformer circuit 30' is provided as a sixteen beam Butler beamforming matrix. Thus, the beamformer circuit forms a total of sixteen antenna beams (i.e. one beam at each of beamformer circuit ports one through sixteen identified with reference numerals 38a–38p in FIG. 5). Thus, a signal fed to predetermined ones of beamformer circuit antenna ports 37a–37p results in the formation of one or more beams which appear in different beam locations in an azimuth plane of the antenna.

Beamformer ports 38a–38p are coupled to a beam combiner circuit 32' which combines beams in a manner to be described below. Beam combiner circuit includes a plurality of phase shifters 42a–42d and a plurality of power divider/combiner circuits 44a–44g. In the exemplary embodiment of FIG. 5, each of the phase shifter circuits 42a–42d introduce a 180 degree phase shift to the signals provided thereto and the power divider/combiner circuits 44a–44g are each provided as equal power, equal phase divider/combiner circuits 44a–44g. The power divider/combiner circuits 44a–44g are coupled to a beam selection circuit 34' which is here provided from a pair of switch circuits 52,54. It should be appreciated, of course, that beam selection circuit could be provided as a seven throw—one pole switch or that any other combination of switches could also be used.

Each of the phase shifters 42 introduces a predetermined phase shift into the signal path in which they are disposed. To produce the beam architecture described below in conjunction with FIG. 7, the phase shifters introduce a 180 degree phase shift into the respective signal paths and the divider/combiner circuits 44a–44f are provided as equal power split and zero-phase shift devices. That is, a signal fed to an input port of one of the devices 44a–44f results in signals at the two output ports having equal power and equal phase. The devices may be provided, for example, as Wilkinson type power dividers.

It should be appreciated, of course, that a beam architecture which is the same as or similar to the beam architecture described below in conjunction with FIG. 7 can also be achieved using a different combination of phase shifters and 42 and combiner/divider circuits 44 (including phase shifters which provide a phase shift other then 180 degrees and combiner/divider circuits which do not have an equal power or an equal phase split).

The switch network 34' is here provided from a pair of single-pole, four-throw switches 52, 54 having common ports 52a, 54a and switch ports 52b–52e and 54b–54e respectively. Common port 54a is coupled to switch port 52e. Thus a signal path can be provided between common port 52a (and thus port 34a') and any of switch ports 52b, 52c, 52d and 54b–54e at which beams are provided from beam combiner circuit 32'.

The beamformer circuit ports 38a, 38e are coupled to two ports of the combiner 44a with a third port of the combiner 44a coupled to a first port of the combiner 44d. Beamformer network ports 38b and 38o are not used.

Beamformer circuit ports 38c and 38m are coupled to two ports of the combiner 44e. It should be noted that port 38m is coupled to the combiner 44e through a phase shifter 42d. A third port of the combiner 44e is coupled to switch port 54b.

Beamformer circuit ports 38d and 38n are coupled to two ports of the combiner 44f. It should be noted that port 38d is coupled to the combiner 44f through a phase shifter 42a. A third port of the combiner 44f is coupled to switch port 54c.

Beamformer circuit port 38f is coupled to switch port 54d and beamformer network port 38g is coupled to switch port 52c.

Beamformer circuit ports 38h and 38i are coupled through phase shifters 42b, 42c respectively to two ports of the combiner 44b. A third port of the combiner 44b is coupled to a first port of the combiner 44c and a third port of the combiner 44c is coupled to the switch port 52b.

Beamformer circuit port 38j is coupled to switch port 52d and beamformer network port 38k is coupled to switch port 54e.

Beamformer circuit ports 38l and 38p are coupled to two ports of the combiner 44g. A third port of the combiner 44g is coupled to the second port of combiner 44d and a third port of the combiner 44d is coupled to a second port of the combiner 44c. A third port of the combiner 44c is coupled to switch port 52b as mentioned above.

Each of the combiner devices thus combine signals fed thereto from the beamformer network and provide output signals at output ports thereof.

The switches 52, 54 are operative to couple particular beam combiner circuit ports 32a'–32g' to a port 34a' of the beam selection circuit 34'. By coupling certain ones of the beam combiner ports 32a'–32g', certain beams defined by the beam combiner circuit 32' are provided at the port 34a'. Thus, in this particular embodiment, only one switch output at a time is selected (i.e. at any one time, only one signal path exists between port 34a' and any of ports 52b–52d and 54b–54e).

It should be appreciated of course that in other embodiments, the beam selection circuit 34' can be operated such that it couples particular beamformer ports 38a–38p to port 34a' of the switch network 34'. The beamformer ports 38a–38p may or may not be coupled to port 34a' of the switch network 34' through a beam combiner circuit. By coupling certain ones of the beamformer ports 38a–38p in the beam selection circuit 34', certain beams or beam combinations can be provided at the port 34a'. Thus, in such an embodiment, it is possible for multiple signal path to exist between port 34a' and any of ports 52b–52d and 54b–54e at any one time. One particular combination of beams desirable in a blind spot detection automotive radar application is described below.

In one embodiment corresponding to a 7 beam, 24 GHz blind spot detection system, the antenna system 30' is provided from a planar array antenna having sixteen radiators in the azimuth plane with a center-to-center spacing between the radiators substantially equal to about 5.588 mm. The beamformer is provided as a sixteen beam Butler beamformer and the sixteen radiators are inputs to the sixteen beam Butler beamformer. The beam combiner and beam selection circuits are as described above.

It should be noted that the particular beam architectures described herein as well as the techniques described herein to provide the beam architectures can also be used in systems having fewer or greater than seven beams and operating at frequencies above or below 24 GHz.

Figure 6:
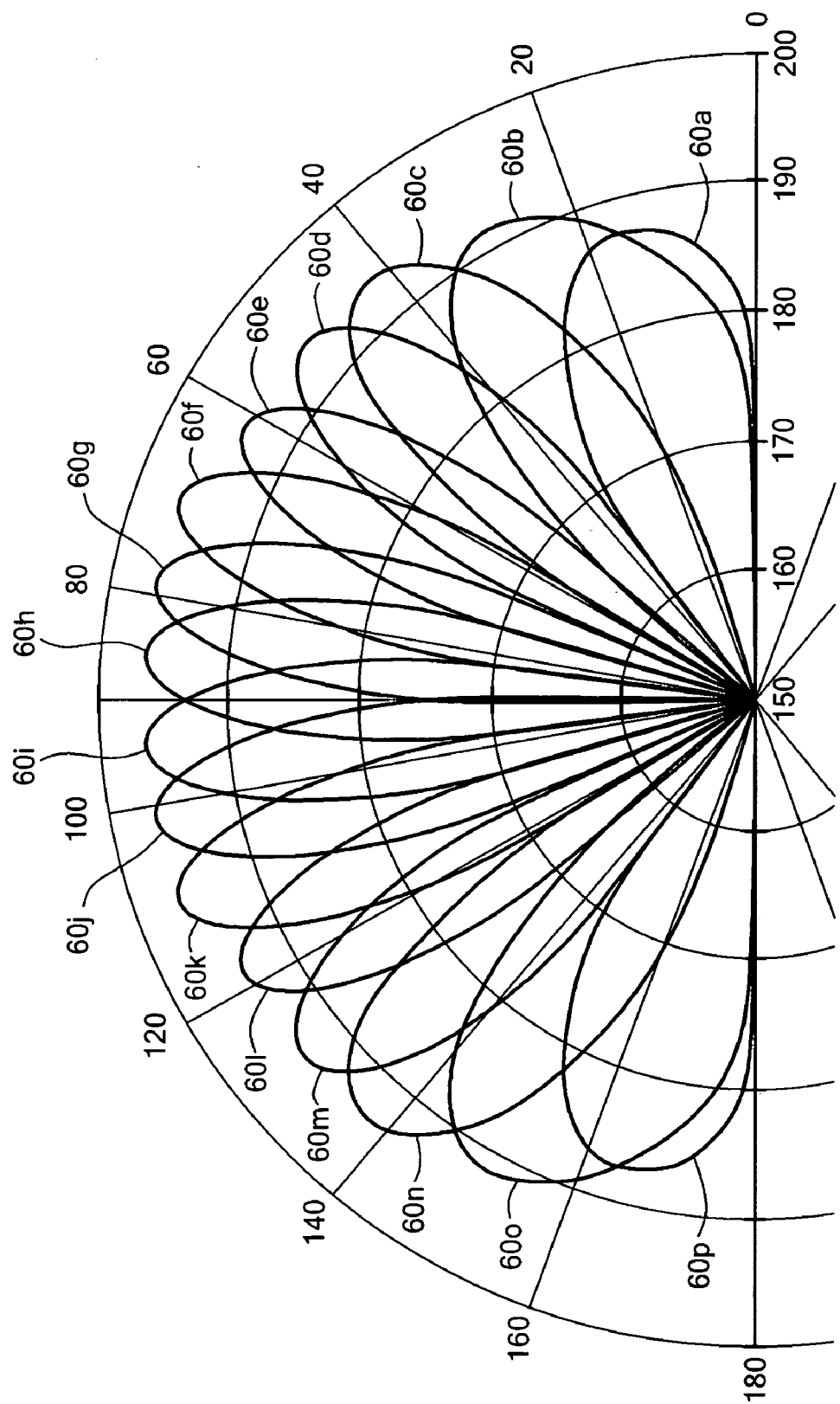
FIG. 6 is a radiation plot of azimuth beams at the output of the beamformer shown in FIG. 5.

Referring now to FIG. 6, in one embodiment, the Butler matrix 36 generates sixteen antenna beams 60a–60p. These beams are independent and are simultaneously available.

The location of the beams with respect to Butler port location is given in Table 1 below where reference numbers 60a–60p represent the relative locations of the beams in space as shown in FIG. 6, and the beam numbers 1–16 refer to the Butler beam port numbers shown in FIG. 5 (and also designated by reference numerals 38a–38p in FIG. 5).

TABLE 1

| Butler Matrix Beam Port Numbers | Reference Number of Beam as Shown In FIG. 6 |
| --- | --- |
| 1 | 60h |
| 2 | 60p |
| 3 | 60d |
| 4 | 60l |
| 5 | 60f |
| 6 | 60m |
| 7 | 60b |
| 8 | 60j |
| 9 | 60g |
| 10 | 60n |
| 11 | 60c |
| 12 | 60k |
| 13 | 60e |
| 14 | 60l |
| 15 | 60a |
| 16 | 60i |

Figure 7:
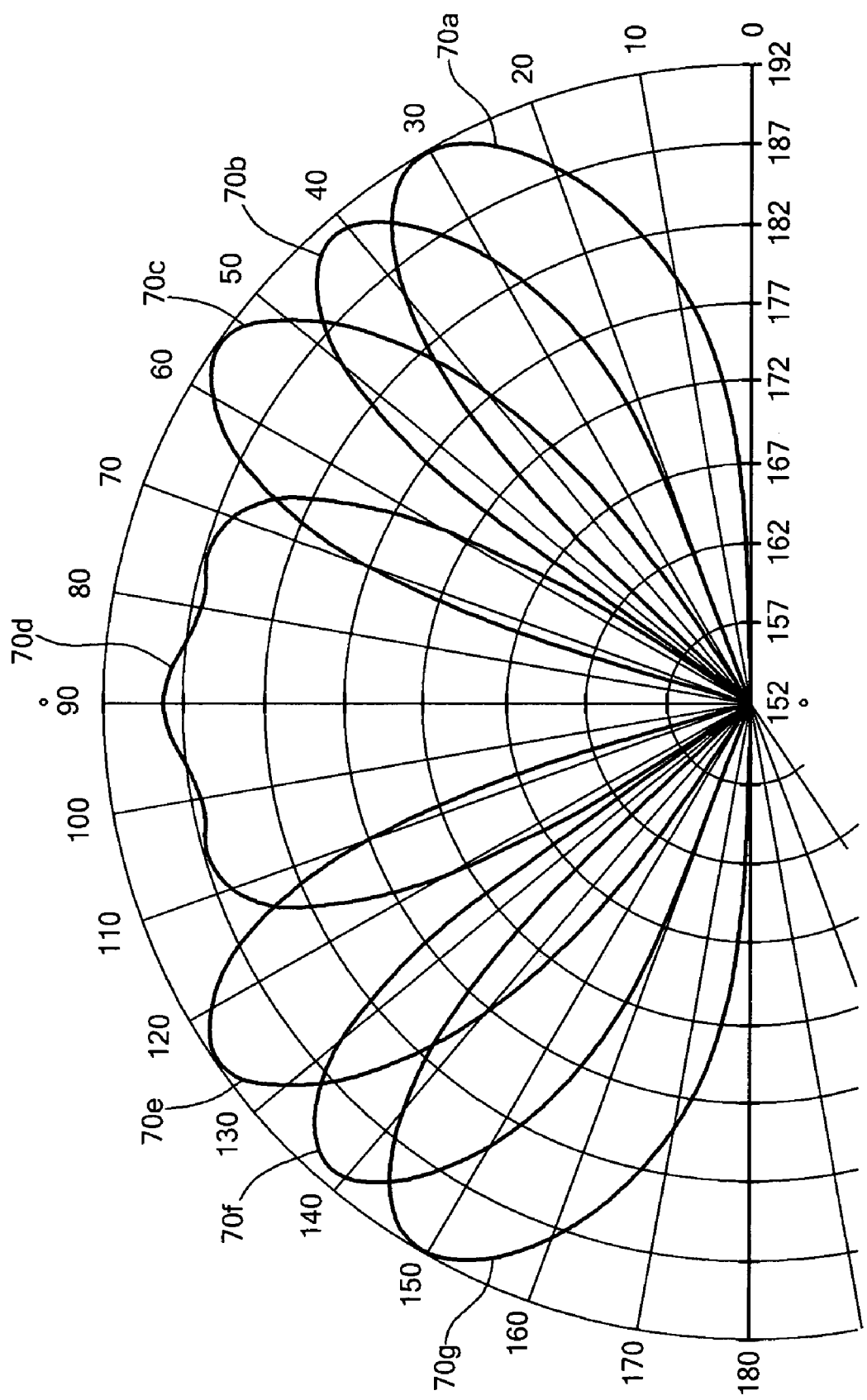
FIG. 7 is a radiation plot of seven azimuth beams for use in an automotive radar blind spot detection system.

The sixteen beams 60a–60p (as shown in FIG. 6) available at the beamformer circuit ports 38a–38p (as shown in FIG. 5) are combined into seven beams 70a–70g as shown in FIG. 7. The beams of the Butler matrix which are combined to provide the seven beams 70a–70g are as indicated in Table 2 below.

TABLE 2

| Beam Number | Combined Beamformer Beams |
| --- | --- |
| 1 | 10 |
| 2 | 6 |
| 3 | 4, 14 |
| 4 | 1, 5, 8, 9, 12, 16 |
| 5 | 3, 13 |
| 6 | 11 |
| 7 | 7 |

The beam combinations shown in Table 2 are achieved using the beam combiner network described in conjunction with FIG. 5. The seven beams are scanned by selecting various switch states of the cascaded one-pole, four-throw (1P4T) switches 52, 54 (FIG. 5).

Referring now to FIG. 7, a beam architecture comprised of a set of antenna beams, here seven antenna beams 70a–70g, is shown. The beam architecture improves angular resolution of a radar system in a desired plane since first and second end beams 70a, 70g in the set of antenna beams are each provided having beamwidths which are narrower than the beamwidth of a middle beam (i.e. beam 70d) in the set of antenna beams. Thus, a substantially equal number of detections occur in each of the antenna beams 70a–70g in response to a target traveling past a radar at a substantially constant velocity and along a substantially parallel path as the radar through the set of antenna beams 70a–70g.

The seven beams 70a–70g shown in FIG. 7 are provided by combining beamformer circuit beams in the manner shown in Table 3 below.

TABLE 3

| Beam No. (FIG. 7 Ref. No.) | Combined Beamformer Beams |
| --- | --- |
| 1 (70g) | 10 |
| 2 (70f) | 6 |
| 3 (70e) | 4, 14 |
| 4 (70d) | 1, 5, 8, 9, 12, 16 |
| 5 (70c) | 3, 13 |
| 6 (70b) | 11 |
| 7 (70a) | 7 |

As can be seen from Table 3, antenna beam number one (identified as beam 70g in FIG. 7) corresponds to beamformer circuit beam number ten (i.e. the beam provided at port 38j in the beamformer circuit 30' of FIG. 5). Thus, beamformer circuit port 38j is directly coupled to switch port 52d. When the switch 52 is set to provide a connection between ports 52d and 52a, antenna beam number one is available at port 52a.

Antenna beam number two (identified as beam 70f in FIG. 7) corresponds to combined beams four and fourteen provided at ports 38d, 38n in the beamformer circuit 30' of FIG. 5. That is, the beamformer circuit beams provided at ports 38d, 38n of the beamformer circuit are combined through combiner circuit 44f and coupled switch port 54c. Thus, when the switch 54 is set to provide a connection between ports 54c and 54a, and switch 52 is set to provide a connection between ports 52e and 52a, antenna beam number two is available at port 52a.

The other antenna beams are similarly made available at switch port 34a' by appropriate switch settings and appropriate connections between the beamformer circuit and the beam combiner circuit.

Comparing the beam architectures shown in FIGS. 1 and 2 with the beam architectures shown in FIGS. 3 and 7, it can be seen that in the beam architectures of FIGS. 3 and 7, the beamwidth of the end beams (e.g. beams 70a, 70g) and the beam width of the middle beams 70c–70e have been modified so that a target traveling beside a vehicle in which the radar is disposed (and passing the vehicle at a substantially constant rate of speed) is detected a similar number of times in each beam. In this particular embodiment, the beams have been adapted or shaped for use in a blind spot detection system. Thus, the beams have been modified or shaped by narrowing the beamwidth of the end beams relative to the beamwidth of the middle beams (e.g. beams 70c, 70d, 70e in FIG. 6). Also, the beamwidth of the middle beams (e.g. beams 70c, 70d, 70e in FIG. 6) have been widened relative to the beamwidth of the end beams (e.g. beams 70a, 70g in FIG. 6). If the beam in the middle of the beam set is provided having a sufficient beamwidth, the radar can obtain a number of detections in the beam which is sufficient to track a target which is adjacent the vehicle. The narrower beams near the ends of the beam set (e.g beams 70a, 70b, 70f, 70g allow the radar to track a target which is further down a lane. Thus, the beams 70a–70g have been shaped to provide enhanced performance in a desired detection environment.

Thus, with this beam architecture, an object traveling through each of the multiple beams will generate a similar number of object detections in each beam as the object moves from beam to beam. Thus, the beam architecture can improve the overall azimuth resolution of a radar for any given number of azimuth beams (greater than two azimuth beams) while having a relatively small impact on cost and system complexity.

As mentioned above, in automotive radar applications for example, the azimuth plane of the antenna corresponds to the plane of the road surface and the beam architecture described herein improves the overall azimuth resolution of the radar for any given number of azimuth beams. It should be appreciated, however, the beam architecture of the present invention can benefit applications other than automotive radar applications.

The beam architecture approach (i.e. the technique and circuits used to provide a particular number of shaped beams for use in a particular application) described in conjunction with FIGS. 3–7 can benefit any application, and in particular any beam-limited application, in which object detections of interest travel primarily in the radar's azimuth plane. Some of the specific automotive radar applications that can benefit from using this approach to radar beam architecture include but are not limited to blind spot detection, lane change, park slot measurement, cross-traffic warning, pre-crash, parking aid (including both front and back-up) and autonomous cruise control (ACC). In these applications, azimuth resolution is relatively important to system performance and the detections of interest are typically objects travelling in a direction substantially parallel to the direction in which the vehicle containing the radar is travelling.

It should be appreciated that although the discussion hereinabove applies to single channel, multi-beam radar systems, it should be appreciated that the beam architecture concepts described herein can be applied in any system including but not limited to monopulse systems and systems having any number of antenna beams greater than two to improve azimuth resolution. Moreover, as mentioned above, the techniques described herein in conjunction with FIGS. 3–7 can be used to increase azimuth resolution of an existing radar system without increasing the cost.

It should also be appreciated that in other applications, it may be desirable to provide the radar having fewer or more the seven antenna beams described above in conjunction with FIG. 7. In particular, the beam combiner circuit can be used to provide any number of beams less than 16 (i.e. any number of beams between one and sixteen beams). The beam combiner circuit can also be used to provide the beams having a shape which is different than the shapes described above. For example, the beam combiner circuit can be used to provide a beam architecture in which the middle beams are provided having a beamwidth which is significantly greater than the beamwidth of the end beams. Alternatively still, the beam combiner circuit can be used to provide beams in which alternating beams have different beamwidths (i.e. alternating narrow and wide antenna beamwidths).

To provide such other beam architectures, the combiner circuit could be provided having fewer or more phase shifters than the number of phase shifters shown in the combiner circuit of FIG. 5. Also, the amount of phase shift provided by each phase shifter could be different than that shown in FIG. 5. For example, phase shifters which provide 45, 90, 135, or 180 degrees of phase shift could also be used. In short, any the phase shifters can provide any amount of phase shift necessary to provide a desired number of beams and beam shapes. Furthermore, the number of combiner circuits could be different than that shown in FIG. 5 and the connections and locations of each combiner circuit could also be different than that shown in FIG. 5. Also, the combiner circuits could be provided as the type which introduce a phase shift (e.g. a 45, 90, 135 or 180 degree phase shift) or as the type which do not introduce a phase shift.

Having described the preferred embodiments of the invention, it will now become apparent to one of ordinary skill in the art that other embodiments incorporating their concepts may be used. Two such alternatives for achieving the same or a similar beam architecture as that described above in conjunction with FIGS. 3–6 are disclosed in conjunction with FIGS. 7 and 8 below.

Referring now to FIG. 8, a planar array has a first surface of a dielectric lens disposed over a radiating aperture thereof. A second surface of the lens is provided having a shape selected such that the lens performs a beam defocusing function for on-axis beams (e.g. the so-called middle beams as shown in FIG. 6) and a focusing function for off-axis beams (e.g. the so-called end beams as shown in FIG. 6) to provide a beam architecture similar to the beam architecture shown in FIG. 7.

One draw back to this approach is an increase in the thickness T of the resulting antenna system as compared to the thickness of a non-lens system such as that described above in conjunction with FIG. 4. Also, the lens-type approach results in systems which are relatively expensive and which have relatively high ohmic losses compared with non-lens systems.

Referring now to FIG. 9, a properly designed non-planar array can eliminate aperture foreshortening and give uniform beamwidths across an azimuth plane. In the exemplary embodiment of FIG. 9, the non-planar array is shown as a cylindrical array. It should be appreciated, however, that other non-planar, conformal shapes, may also be used.

The non-planar array approach, however, also has several drawbacks. For example, the antenna structure is relatively complex compared with the antenna structure of a planar array structure such as that described above in conjunction with FIG. 5. Furthermore, a non-planar array approach would likely result in the inefficient use of beams since the middle beams would not be wider than the end beams.

It is felt therefore that these embodiments should not be limited to disclosed embodiments but rather should be limited only by the spirit and scope of the appended claims. All publications and references cited herein are expressly incorporated herein by reference in their entirety.

What is claimed is:

1. An antenna system for use in a vehicle radar, the antenna system comprising:

a beamformer circuit having a plurality of antenna ports and a plurality of beam ports, said beam former circuit adapted to receive an RF signal at each of the antenna ports and in response thereto, to simultaneously form a plurality of antenna beams at fixed locations in space, with each of the respective antenna beams coupled to a respective one of the beam ports; and a beam combiner circuit adapted to receive signals from the beam ports of said beamformer circuit and to combine the signals provided thereto in such a way as to provide a resultant number of combined beams which is less than the number of beams formed by said beamformer circuit and with each of the beams having a desired beam shape.

2. The system of claim 1 wherein said beam combining circuit has a plurality of output ports with a different beam provided at each output port and wherein said beam combining circuit is operative to simultaneously provide a radio frequency signal path between at least two of the antenna ports of said beamformer circuit and one of said plurality of output ports of said beam combining circuit.

3. The system of claim 1 further comprising a beam selection circuit having a plurality of antenna beam ports and one output port, each of said antenna beam ports coupled to at least one of the plurality of outputs of said beam combiner circuit.

4. The system of claim 3 further comprising a plurality of antenna elements each of said antenna elements coupled to a corresponding one of the plurality of antenna ports of said beamformer circuit.

5. The system of claim 4 wherein said beamformer circuit forms antenna beams at fixed locations in space.

6. The system of claim 5 wherein said beamformer circuit is provided as a Butler beamforming matrix.

7. The system of claim 6 wherein said beam selection circuit comprises a plurality of switch circuits with at least a first one of said plurality of switch circuits having a common port coupled to an input port of a second one of said plurality of switch circuits.

8. The system of claim 7 said beamformer circuit, said beam combining circuit and said switch circuit are operative to simultaneously provide a radio frequency signal path between at least two of the plurality of antenna elements and the output port of said switch circuit.

9. The system of claim 1 wherein said beam combiner circuit combines beams from said beamformer circuit to provide beams having a predetermined beam shape.

10. An antenna system comprising:

a beamformer circuit having a plurality of antenna ports and a plurality of beam ports; and a beam combiner circuit adapted to receive signals from the beam ports of said beamformer circuit and to combine the signals provided thereto in such a way as to provide a resultant number of combined beams which is less than the number of beams formed by said beamformer circuit and wherein said beam combiner circuit combines beams from said beamformer circuit to provide a set of antenna beams with a first end beam and a second end beam each having an antenna beamwidth which is narrower than a beamwidth of a middle beam.

11. The system of claim 10 wherein said beamformer circuit forms a plurality of antenna beams at fixed locations in space.

12. An automotive radar system comprising:

an antenna system which simultaneously forms a set of antenna beams at fixed locations in space with a first end beam and a second end beam each having an antenna beamwidth which is narrower than a beamwidth of a middle beam.

13. The system of claim 12 wherein the antenna system comprises:

a beamformer network having a plurality of antenna ports and a plurality of network ports; and a switched beam combiner circuit having a first plurality of ports with each one of the first plurality of ports coupled to a corresponding one of the plurality of network ports of said beamformer network and having an output port.

14. The system of claim 13 wherein the beamformer network is provided as a Butler matrix beamformer network.

15. The system of claim 14 wherein said a switched beam combiner circuit comprises a switch circuit having a plurality of switch ports coupled to the network ports of said Butler matrix beamformer network and having at least one common port and wherein said switch circuit combines beams from said Butler matrix beamformer network to proved the system having an antenna beam at a desired location.

16. The system of claim 15 wherein said switched beam combiner circuit combines beams from said Butler matrix beamformer network to provide a plurality of antenna beams with each of the antenna beams having a beamwidth selected such that on object traveling through each of the beams is detected a substantially equal number of times in each beam.

17. The system of claim 16 wherein said Butler matrix beamformer network provides sixteen beams and said switched beam combiner circuit combines said beams to provide seven antenna beams at desired locations.

18. The system of claim 17 wherein said switched beam combiner circuit combines beams from said Butler matrix beamformer network to provide five antenna beams at desired locations.

19. The system of claim 18 wherein the radar system corresponds to at least one of: blind spot detection, lane change, park slot measurement, cross-traffic warning, pre-crash, a front parking aid, a back-up parking aid and autonomous cruise control (ACC).

20. A method of operating a radar system comprising:

simultaneously forming a set of antenna beams at fixed locations in space with each of the antenna beams having an antenna beamwidth selected such that a first end beam and a second end beam are each provided having an antenna beamwidth which is narrower than a beamwidth of a middle beam; and detecting an object with at least one antenna beam in the set of antenna beams.

21. The method of claim 20 further comprising detecting an object in a plurality of the antenna beams.

22. The method of claim 20 wherein forming a set of antenna beams comprises forming seven antenna beams with each of the antenna beams having an antenna beamwidth selected such that each antenna beam covers a similar amount of area in space within a given coverage zone.

23. The method of claim 20 wherein forming a set of antenna beams comprises forming seven antenna beams.

* * * * *

UNITED STATES PATENT AND TRADEMARK OFFICE
CERTIFICATE OF CORRECTION

PATENT NO. : 7,248,215 B2
APPLICATION NO. : 11/026506
DATED : July 24, 2007
INVENTOR(S) : Pleva et al.

It is certified that error appears in the above-identified patent and that said Letters Patent is hereby corrected as shown below:

Column 1, line 66 delete "desire" and replace with --desired--.

Column 2, line 8 delete "approach a" and replace with --approach, a--.

Column 3, line 26 delete "invention a" and replace with --invention, a--.

Column 3, line 28 delete "architecture) to" and replace with --architecture to--.

Column 3, line 33 delete "shaped a beam" and replace with --shaped beam--.

Column 5, line 4 delete "14b" 14f." and replace with --14b'-14f.--.

Column 5, line 31 delete "perpendicular the a face" and replace with --perpendicular to the face--.

Column 5, line 35 delete "beams" and replace with --beam--.

Column 5, line 37 delete "results" and replace with --result--.

Column 6, line 4 delete "occurs" and replace with --occur--.

Column 6, line 26 delete "results" and replace with --result--.

Column 6, line 43 delete "for example" and replace with --, for example,--.

Column 6, line 49 delete "of course" and replace with --, of course,--.

Column 6, line 51 delete "preformed" and replace with --performed--.

Column 6, line 59 delete "cost" and replace with --costs--.

Column 6, line 61 delete "provided" and replace with --provide--.

Column 7, lines 18-19 delete "beams. Other" and replace with --beams, other--.

Column 7, line 23 delete "know." and replace with --known.--.

Column 7, line 27 delete "characteristic" and replace with --characteristics--.

Column 8, line 4 delete "that beam" and replace with --that the beam--.

UNITED STATES PATENT AND TRADEMARK OFFICE
CERTIFICATE OF CORRECTION

PATENT NO. : 7,248,215 B2
APPLICATION NO. : 11/026506
DATED : July 24, 2007
INVENTOR(S) : Pleva et al.

It is certified that error appears in the above-identified patent and that said Letters Patent is hereby corrected as shown below:

Column 8, lines 21-22 delete "phase shifters and 42" and replace with --phase shifters 42--.

Column 8, line 23 delete "then" and replace with --than--.

Column 9, line 19 delete "path" and replace with --paths--.

Column 11, line 25 delete ", 70g allow" and replace with --, 70g) allow--.

Column 11, line 42 delete ", the beam" and replace with --, that the beam--.

Column 12, line 6 delete "the" and replace with --than--.

Column 12, line 27 delete "any the" and replace with --any of the--.

Column 13, line 53 delete "claim 7 said" and replace with --claim 7 wherein said--.

Column 14, line 28 delete "said a switched" and replace with --said switched--.

Column 14, line 35 delete "proved" and replace with --provide--.

Column 14, line 41 delete "on" and replace with --an--.

Signed and Sealed this

Third Day of June, 2008

JON W. DUDAS
*Director of the United States Patent and Trademark Office*